United States Patent
Koh et al.

(10) Patent No.: US 11,236,208 B2
(45) Date of Patent: Feb. 1, 2022

(54) FILM

(71) Applicant: DAIKIN INDUSTRIES, LTD., Osaka (JP)

(72) Inventors: Meiten Koh, Osaka (JP); Kouji Yokotani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 989 days.

(21) Appl. No.: 15/322,832

(22) PCT Filed: Jun. 30, 2015

(86) PCT No.: PCT/JP2015/068805
§ 371 (c)(1),
(2) Date: Dec. 29, 2016

(87) PCT Pub. No.: WO2016/002768
PCT Pub. Date: Jan. 7, 2016

(65) Prior Publication Data
US 2017/0152358 A1 Jun. 1, 2017

(30) Foreign Application Priority Data
Jul. 3, 2014 (JP) .............................. JP2014-137778

(51) Int. Cl.
| C08J 5/18 | (2006.01) |
| C08G 73/10 | (2006.01) |
| B32B 27/28 | (2006.01) |
| B32B 27/34 | (2006.01) |
| G02B 5/30 | (2006.01) |
| B32B 27/32 | (2006.01) |
| B32B 27/36 | (2006.01) |
| B32B 7/12 | (2006.01) |
| B32B 27/08 | (2006.01) |

(52) U.S. Cl.
CPC .................. *C08J 5/18* (2013.01); *B32B 7/12* (2013.01); *B32B 27/08* (2013.01); *B32B 27/281* (2013.01); *B32B 27/325* (2013.01); *B32B 27/34* (2013.01); *B32B 27/36* (2013.01); *B32B 27/365* (2013.01); *C08G 73/10* (2013.01); *C08G 73/1039* (2013.01); *C08G 73/1042* (2013.01); *C08G 73/1078* (2013.01); *G02B 5/30* (2013.01); *B32B 2250/02* (2013.01); *B32B 2250/24* (2013.01); *B32B 2307/202* (2013.01); *B32B 2307/306* (2013.01); *B32B 2307/40* (2013.01); *B32B 2307/412* (2013.01); *B32B 2307/732* (2013.01); *B32B 2457/20* (2013.01); *C08J 2379/08* (2013.01)

(58) Field of Classification Search
CPC . B32B 17/06; B32B 2250/02; B32B 2250/24; B32B 2307/202; B32B 2307/306; B32B 2307/40; B32B 2307/412; B32B 2307/732; B32B 2457/20; B32B 27/08; B32B 27/281; B32B 27/325; B32B 27/34; B32B 27/36; B32B 27/365; B32B 7/12; C08G 73/10; C08G 73/1039; C08G 73/1042; C08G 73/1078; C08J 2379/08; C08J 5/18; G02B 5/30
See application file for complete search history.

(56) References Cited

U.S. PATENT DOCUMENTS

| 4,929,405 A | * | 5/1990 | Kohn ................... B01D 69/122 |
| | | | 210/500.39 |
| 5,324,813 A | * | 6/1994 | Hougham .......... C08G 73/1039 |
| | | | 528/125 |
| 5,694,513 A | | 12/1997 | Okaniwa |
| 2005/0037213 A1 | | 2/2005 | Kihara et al. |
| 2005/0221023 A1 | | 10/2005 | Sakamoto et al. |
| 2006/0204678 A1 | | 9/2006 | Hayashi et al. |
| 2008/0090927 A1 | | 4/2008 | Ishii et al. |
| 2009/0109385 A1 | | 4/2009 | Nagase et al. |
| 2011/0178266 A1 | | 7/2011 | Cho et al. |
| 2011/0311796 A1 | | 12/2011 | Jung et al. |
| 2013/0035447 A1 | | 2/2013 | Jeong et al. |

FOREIGN PATENT DOCUMENTS

| JP | 8-184718 A | 7/1996 |
| JP | 2004-99827 A | 4/2004 |
| JP | 2004-231946 A | 8/2004 |
| JP | 2004-359941 A | 12/2004 |
| JP | 2005-208676 A | 8/2005 |
| JP | 2005-326599 A | 11/2005 |
| JP | 2006-154709 A | 6/2006 |
| JP | 2006-206756 A | 8/2006 |
| JP | 2010-180349 A | 8/2010 |
| JP | 2010-280151 A | 12/2010 |
| JP | 2010-536981 A | 12/2010 |
| JP | 2011-141448 A | 7/2011 |
| JP | 2012-503701 A | 2/2012 |
| JP | 2012-146905 A | 8/2012 |
| JP | 2013-523939 A | 6/2013 |
| JP | 2016-26926 A | 2/2016 |
| WO | 2007/138882 A1 | 12/2007 |

OTHER PUBLICATIONS

International Search Report for PCT/JP2015/068805 dated Sep. 15, 2015 [PCT/ISA/210].

(Continued)

*Primary Examiner* — John D Freeman

(74) *Attorney, Agent, or Firm* — Sughrue Mion, PLLC

(57) ABSTRACT

A film having high heat resistance and a low total haze value and yellowness index. The film includes a fluorinated polyimide layer having a total haze value of 4 or lower, a yellowness index of 3 or lower, and a total luminous transmittance of 90% or higher.

10 Claims, No Drawings

(56) References Cited

OTHER PUBLICATIONS

International Search Report for PCT/JP2015/068815 dated Oct. 6, 2015 [PCT/ISA/210].
Report of Experimental Results, Technical Division, Kawamura Sangyo Co., Ltd. Aug. 22, 2016, Opponent's Exhibit No. 3, 17 pages.
Opposition against JP 5871094 B corresponding to PCT/JP2015/068805 and JP-A 2015-130947 dated Aug. 24, 2016.
International Preliminary Report on Patentability, dated Jan. 3, 2017, from the International Bureau in counterpart International application No. PCT/JP2015/068805.
International Preliminary Report on Patentability, ,dated Jan. 3, 2017, from the International Bureau in counterpart International application No. PCT/JP2015/068815.

* cited by examiner

FILM

This application is a National Stage of International Application No. PCT/PCT/JP2015/068805, filed on Jun. 30, 2015, which claims priority from Japanese Patent Application No. 2014-137778, filed on Jul. 3, 2014, the contents of all of which are incorporated herein by reference in their entirety.

TECHNICAL FIELD

The present invention relates to films.

BACKGROUND ART

Transparent conductive films and bases for flexible displays and flexible touchscreens need to have transparency and flexibility, as well as heat resistance which allows the films and bases to endure high temperatures during the production process. Polyimides have high heat resistance, and thus can be used as material for these applications. Therefore, various studies on polyimide: have been performed.

Patent Literature 1 proposes an optical film as a retardation plate for optical compensation to be used for liquid crystal display devices, although it is not a polyimide film to be used for flexible electronic devices. This optical film includes a birefringent layer and a transparent film having a high birefringence in the thickness direction and formed from a polyimide that is soluble in nonpolar methyl isobutyl ketone.

CITATION LIST

Patent Literature

Patent Literature 1: JP 2005-208676 A

SUMMARY OF INVENTION

Technical Problem

Conventional polyimide films have excellent heat resistance, but also especially have a high total haze value and yellowness index (YI). Thus, such films need to be improved in terms of transparency.

In consideration of the above state of the art, the present invention aims to provide a film having high heat resistance and a low total haze value and yellowness index.

Solution to Problem

Specifically, the present invention relates to a film including a fluorinated polyimide layer having a total haze value of 4 or lower, a yellowness index of 3 or lower, and a total luminous transmittance of 90% or higher.

The fluorinated polyimide layer is preferably formed from a fluorinated polyimide containing a polymerized unit (A) based on a fluorinated diamine and a polymerized unit (B) based on a fluorinated acid anhydride, the fluorinated diamine including a fluorinated diamine represented by the following formula (1):

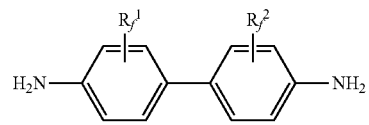

(wherein $R_f^1$ and $R_f^2$ are substituents of the aromatic rings, and one of four substituent portions in one aromatic ring is replaced by the substituent; $R_f^1$ and $R_f^2$ may be the same as or different from each other, and are each a fluorine atom or a C1-C8 fluorine-containing alkyl group); and/or a fluorinated diamine represented by the following formula (2):

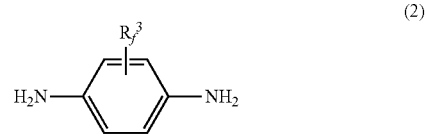

(wherein $R_f^3$ is a substituent of the aromatic ring, and one of four substituent portions in the aromatic ring is replaced by the substituent; $P_f^3$ is a fluorine atom or a C1-C8 fluorine-containing alkyl group), the fluorinated acid anhydride including a fluorinated acid anhydride represented by the following formula (3):

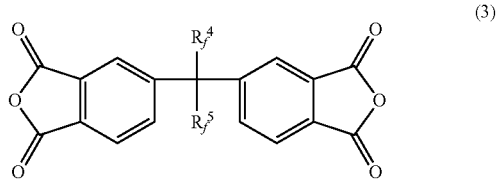

wherein $R_f^4$ and $R_f^5$ may be the same as or different from each other, and are each a fluorine atom or a C1-C8 fluorine-containing alkyl group.

The film of the present invention preferably has 10 or less optical defects having a diameter of 0.15 mm or greater per square meter.

The fluorinated polyimide layer preferably contains ammonium ions in an amount of at most 100 ppm relative to the fluorinated polyimide layer.

The fluorinated polyimide preferably contains 60 mol % or more of the polymerized units (A) and (B) relative to all the polymerized units.

The fluorinated polyimide preferably contains 30 mol % or more of the polymerized unit (B) relative to all the polymerized units.

The fluorinated polyimide preferably further contains a polymerized unit (C) based on a non-fluorinated diamine.

The fluorinated polyimide preferably further contains a polymerized unit (D) based on a different acid anhydride.

The film of the present invention preferably further includes glass or a transparent resin base which is not formed from a fluorinated polyimide.

The film of the present invention is preferably to be used for a transparent conductive base or a base for flexible displays.

The film of the present invention is preferably an optical film.

Advantageous Effects of Invention

The film of the present invention has high heat resistance and a low total haze value and yellowness index.

DESCRIPTION OF EMBODIMENTS

The present invention will be described in detail below.

The film of the present invention characteristically includes a fluorinated polyimide layer having a total haze value of 4 or lower, a yellowness index of 3 or lower, and a total luminous transmittance of 90% or higher.

The total haze value of the fluorinated polyimide layer is preferably 2 or lower. The lower limit thereof may be any value, and may be 0.1.

The fluorinated polyimide layer preferably has an internal haze value of 2 or lower, more preferably 1 or lower. The lower limit thereof may be any value, and may be 0.1.

The total haze value is determined by the luminous transmittance test in conformity with ASTM D1003 using a haze meter NDH7000SP CU2II (trade name) (Nippon Denshoku Industries Co., Ltd.).

The internal haze value is determined using a haze meter NDH7000SP CU2II (trade name) (Nippon Denshoku Industries Co., Ltd.). Specifically, a glass cell is charged with water and a reference value is determined. Then, a film is put into the water and the haze value is determined. Finally, the internal haze value is determined by calculating the difference between the resulting haze value and the reference value.

The yellowness index (YI) of the fluorinated polyimide layer is more preferably 2.5 or lower. The lower limit thereof may be any value, and may be 0.1.

The yellowness index (YI) is expressed by the dYI value which corresponds to the difference in YI value between a sample and a white standard plate used as a color standard using SM series color computer SM-7 (Suga Test Instruments Co., Ltd.). The greater the dYI value is, the higher the yellowness is.

The total luminous transmittance of the fluorinated polyimide layer as more preferably 92% or higher. The upper limit thereof may be any value, and may be 99%.

The total luminous transmittance is determined by the luminous transmittance test in conformity with ASTM D1003 using a haze meter NDH7000SP CU2II (trade name) (Nippon Denshoku industries Co., Ltd.).

The fluorinated polyimide layer preferably has a glass transition temperature of 260° C. or higher. The glass transition temperature is more preferably 270° C. or higher, still more preferably 280° C. or higher, while preferably 380° C. or lower, more preferably 360° C. or lower.

The glass transition temperature (° C.) herein is determined as follows. Using a differential scanning calorimeter (DSC, RTG220, Seiko Instruments Inc.), a sample is subjected to temperature increase (first run), temperature decrease, and temperature increase (second run) at a rate of 10° C./min within the temperature range of −50° C. to 200° C. to provide an endothermic curve in the second run. The middle point of the endothermic curve obtained in the second run is defined as the glass transition temperature.

The fluorinated polyimide layer contains ammonium ions in an amount of preferably at most 100 ppm relative to the fluorinated polyimide layer. The amount of ammonium ions is more preferably at most 80 ppm, still more preferably at most 50 ppm. The lower limit thereof may be any value, and may be 0.01 ppm. If the amount of ammonium ions is kept within the above range, the fluorinated polyimide layer can have a low total haze value and yellowness index and a high total luminous transmittance.

The amount of ammonium ions can be determined by ion chromatography. Specifically, a polymer (or a polymer film) is put into water and sonicated for about two hours, and then the polymer (or the polymer film) is filtered off. The amount of ammonium ions dissolved in the filtrate can be determined by ion chromatography.

The fluorinated polyimide layer contains coloring ions other than ammonium ions in an amount of preferably at most 200 ppm, more preferably at most 50 ppm, still more preferably at most 10 ppm, relative to the fluorinated polyimide layer. If the amount of coloring ions is kept within the above range, the fluorinated polyimide layer can have a low total haze value and yellowness index and a high total luminous transmittance.

Examples of the coloring ions include transition metal cations such as $Fe^{2+}$, $Fe^{3+}$, and $Ni^{2+}$, and anions of strong acids such as $Cl^-$ and $SO_4^{2-}$.

The amount of coloring ions is a value determined by the following method. That is, a certain amount of a fluorinated polyimide (or a fluorinated polyimide layer) is dissolved in a solvent such as NMP, and then the solution is dropwise added to water under stirring. The amount of coloring ions dissolved in water is determined by ion chromatography, and the concentration thereof is converted into a desired value.

The amount of coloring ions is not the amount of coloring ions contained in the solvent but the amount of coloring ions contained in the fluorinated polyimide (or the fluorinated polyimide layer) itself.

Specifically, for example, 10 g of a fluorinated polyimide may be dissolved in 50 ml of NMP and the solution may be then dropwise added to 150 ml of water.

The fluorinated polyimide layer preferably has a thickness tolerance within ±20%. The thickness tolerance within the above range may allow the fluorinated polyimide layer to have a low total haze value and yellowness index and a high total luminous transmittance. The thickness tolerance of the fluorinated polyimide layer is more preferably within ±15%, still more preferably within ±10%.

The thickness tolerance can be determined as follows. Specifically, the thickness of the fluorinated polyimide layer is measured over the entire layer, and then the thickness tolerance is calculated from the average value thereof and the upper and lower limit values thereof.

The thickness of the fluorinated polyimide layer is preferably 500 μm or smaller, more preferably 200 μm or smaller, still more preferably 100 μm or smaller, much more preferably 50 μm or smaller, particularly preferably 30 μm or smaller, while preferably 0.05 μm or greater, more preferably 0.1 μm or greater. In other words, the fluorinated polyimide layer is preferably thick if it needs to have sufficient strength, while the fluorinated polyimide layer is preferably thin in other cases. In order to achieve sufficient strength by means of other material, the fluorinated polyimide layer is preferably used in the form of a laminate with a film of glass, a cycloolefin (co)polymer (COP, COC), polyethylene terephthalate (PET) resin, polyethylene naphthalate (PEN) resin, or polycarbonate (PC) resin.

The thickness of the fluorinated polyimide layer can be determined using a contact-type thickness meter, an optical-type thickness meter, or combination thereof.

The fluorinated polyimide layer preferably has a tensile strength at break of 1 MPa or higher, more preferably 5 MPa or higher. The upper limit thereof may be any value, and may be 100 MPa.

The tensile strength at break is determined at 500 mm/min and 23° C. using a dumbbell No. 5 and a tensile tester (Tensilon RTG-1310, A&D Co., Ltd.) in conformity with JIS K6251:1993.

The film of the present invention includes a fluorinated polyimide layer.

The fluorinated polyimide layer is preferably formed from a fluorinated polyimide containing: a polymerized unit (A) based on a fluorinated diamine represented by the following formula (1):

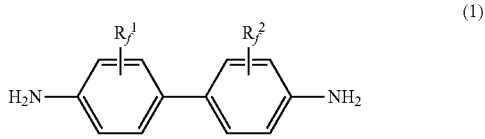

(wherein $R_f^1$ and $R_f^2$ are substituents of the aromatic rings, and one of four substituent portions in one aromatic ring is replaced by the substituent; $R_f^1$ and $R_f^2$ may be the same as or different from each other, and are each a fluorine atom or a C1-C8 fluorine-containing alkyl group) and/or a fluorinated diamine represented by the following formula (2):

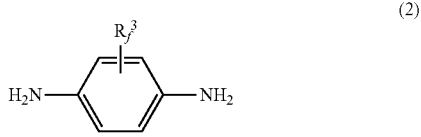

(wherein $R_f^3$ is a substituent of the aromatic ring, and one of four substituent portions in the aromatic ring is replaced by the substituent; $R_f^3$ is a fluorine atom or a C1-C8 fluorine-containing alkyl group); and a polymerized unit (B) based on a fluorinated acid anhydride represented by the following formula (3):

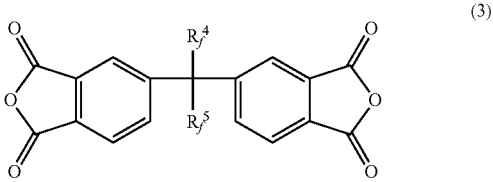

(wherein $R_f^4$ and $R_f^5$ may be the same as or different from each other, and are each a fluorine atom or a C1-C8 fluorine-containing alkyl group).

In the formula (1), $R_f^1$ and $R_f^2$ may be the same as or different from each other, and are each a fluorine atom or a C1-C8 fluorine-containing alkyl group, preferably a fluorine atom or a C1-C4 fluorine-containing alkyl group, more preferably a fluorine atom or a C1-C3 fluorine-containing alkyl group. Specifically, a fluorine atom, a fluoromethyl group, a difluoromethyl group, a trifluoromethyl group, $HCF_2CF_2—$, $CF_3CF_2—$, $CF_3CH_2—$, $CF_3CF_2CF_2—$, or $CF_3CF_2CF_2CH_2—$ is preferred, and a fluorine atom, a fluoromethyl group, a difluoromethyl group, a trifluoromethyl group, $CF_3CF_2—$, or $HCF_2CF_2—$ is more preferred. A trifluoromethyl group is particularly preferred.

Preferred specific examples of the fluorinated diamine represented by the formula (1) include fluorinated biphenyl-diamines. More preferred are 2,2'-bis(trifluoromethyl)-4,4'-diaminobiphenyl and 2,2'-bis(hexafluoroethyl)-4,4'-diaminobiphenyl, particularly preferred is 2,2'-bis(trifluoromethyl)-4,4'-diaminobiphenyl.

In the formula (2), $R_f^3$ is a fluorine atom or a C1-C8 fluorine-containing alkyl group, preferably a fluorine atom or a C1-C4 fluorine-containing alkyl group, more preferably a fluorine atom or a C1-C3 fluorine-containing alkyl group. Specifically, a fluorine atom, a fluoromethyl group, a difluoromethyl group, a trifluoromethyl group, $HCF_2CF_2—$, $CF_3CF_2—$, $CF_3CH_2—$, $CF_3CF_2CF_2—$, or $CF_3CF_2CF_2CH_2—$ is preferred, and a fluorine atom, a fluoromethyl group, a difluoromethyl group, a trifluoromethyl group, $HCF_2CF_2—$, or $CF_3CF_2—$ is more preferred. A trifluoromethyl group is particularly preferred.

Preferred specific examples of the fluorinated diamine represented by the formula (2) include 2-trifluoromethyl diamine and 2-hexafluoroethyl diamine. Particularly preferred is 2-trifluoromethyl diamine.

In the formula (3), $R_f^4$ and $R_f^5$ may be the same as or different from each other, and are each a fluorine atom or a C1-C8 fluorine-containing alkyl group, preferably a fluorine atom or a C1-C4 fluorine-containing alkyl group, more preferably a fluorine atom or a C1-C3 fluorine-containing alkyl group. Specifically, a fluorine atom, a fluoromethyl group, a difluoromethyl group, a trifluoromethyl group, $HCF_2CF_2—$, $CF_3CF_2—$, $CF_3CH_2—$, $CF_3CF_2CF_2—$, or $CF_3CF_2CF_2CH_2—$ is preferred, and a fluorine atom, a fluoromethyl group, a difluoromethyl group, a trifluoromethyl group, $HCF_2CF_2—$, or $CF_3CF_2—$ is more preferred. A trifluoromethyl group is particularly preferred.

The fluorinated acid anhydride represented by the formula (3) is particularly preferably 2,2-bis(3,4-dicarboxyphenyl) hexafluoropropane dianhydride.

The polymerized unit (A) is a polymerized unit based on the fluorinated diamine represented by the formula (1) and/or the fluorinated diamine represented by the formula (2). It may be based on one or two or more kinds of the fluorinated diamine represented by the formula (1), may be based on one or two or more kinds of the fluorinated diamine represented by the formula (2), or may be based on one or two or more kinds of the fluorinated diamine represented by the formula (1) and one or two or more kinds of the fluorinated diamine represented by the formula (2). For good heat resistance and solubility in solvents, the polymerized unit (A) is preferably a polymerized unit based on the fluorinated diamine represented by the formula (1).

The polymerized unit (B) is a polymerized unit based on the fluorinated acid anhydride represented by the formula (3). It may be based on one or two or more kinds of the fluorinated acid anhydride represented by the formula (3).

The fluorinated polyimide preferably has a compositional ratio between the polymerized units (A) and (B) ((A):(B) (mole ratio)) of 70:30 to 30:70, more preferably 60:40 to 40:60. The compositional ratio between the polymerized units (A) and (B) within such a range may allow the fluorinated polyimide layer to have a low total haze value and yellowness index and a high total luminous transmittance. The compositional ratio between the polymerized units (A) and (B) ((A):(B) (mole ratio)) is still more preferably 52:48 to 48:52, particularly preferably 51:49 to 49:51.

The fluorinated polyimide may contain a different polymerized unit in addition to the polymerized units (A) and (B). Still, the fluorinated polyimide preferably contains 60 mol % or more of the polymerized units (A) and (B) relative to all the polymerized units.

Since the sum of the proportions of the polymerized units (A) and (B) is 60 mol % or more relative to all the polymerized units in the fluorinated polyimide, the fluorinated polyimide layer can have a low total haze value and yellowness index and a high total luminous transmittance. The sum of the proportions of the polymerized units (A) and (B) is more preferably 65 mol % or more, still more preferably 70 mol % or more, particularly preferably 80 mol % or more. The upper limit thereof may be 100 mol %.

The fluorinated polyimide preferably contains 30 mol % or more of the polymerized unit (A) relative to all the polymerized units. Since the proportion of the polymerized unit (A) relative to all the polymerized units of the fluorinated polyimide is within such a range, the fluorinated polyimide layer can have a low total haze value and yellowness index and a high total luminous transmittance. The proportion of the polymerized unit (A) is more preferably 40 mol % or more, still more preferably 50 mol % or more, relative to all the polymerized units.

The fluorinated polyimide preferably contains 30 mol % or more of the polymerized unit (B) relative to all the polymerized units. Since the proportion of the polymerized unit (B) relative to all the polymerized units of the fluorinated polyimide is within such a range, the fluorinated polyimide layer can have a low total haze value and yellowness index and a high total luminous transmittance. The proportion of the polymerized unit (B) is more preferably 40 mol % or more, still more preferably 50 mole % or more, relative to all the polymerized units.

Examples of the different polymerized unit include polymerized units based on any of non-fluorinated diamines, non-fluorinated acid anhydrides, and fluorinated acid anhydrides other than the fluorinated acid anhydride represented by the formula (3). It is also one preferred embodiment of the present invention that the fluorinated polyimide further contains a polymerized unit (C) based on a non-fluorinated diamine. It is also one preferred embodiment of the present invention that the fluorinated polyimide further contains a polymerized unit (D) based on a different acid anhydride such as a non-fluorinated acid anhydride or a fluorinated acid anhydride other than the fluorinated acid anhydride represented by the formula (3).

The fluorinated polyimide may contain any amounts of the polymerized units (C) and (D). The sum of the proportions of the polymerized units (C) and (D) is preferably 40 mol % or less. If the sum of the proportions of the polymerized units (C) and (D) exceeds 40 mol %, the film may have poor solubility in solvents and be less likely to exert desired optical characteristics.

The proportion of the polymerized unit (D) is preferably 20 mol % or less relative to all the polymerized units. If the proportion of the polymerized unit (D) exceeds 20 mol %, the film may have poor solubility in solvents and be less likely to exert desired optical characteristics.

Examples of the non-fluorinated diamine include diaminodiphenyl ether, diaminodiphenyl methane, diaminodiphenyl propane, diaminodiphenyl sulfone, and diaminobiphenyl.

Examples of the different acid anhydride include non-fluorinated acid anhydrides such as pyromellitic dianhydride, biphenyltetracarboxylic dianhydride, benzophenonetetracarboxylic dianhydride, phenylene bis(trimellitic acid monoester acid anhydride), and 2,2'-bis(3,4-dicarboxyphenyl)propane dianhydride; and fluorinated acid anhydrides such as 2,2'-bis(3,4-dicarboxycyclohexyl)hexafluoropropane dianhydride, and acid anhydrides formed by substituting an aromatic ring of pyromellitic dianhydride or biphenyltetracarboxylic dianhydride by a trifluoromethyl group or a fluoro group.

The imidization ratio of the fluorinated polyimide is preferably as high as possible, and the upper limit thereof is 100%. Too low an imidization ratio may cause a low relative permittivity, and thus the lower limit thereof is preferably 70%. The imidization ratio is determined by IR analysis.

The fluorinated polyimide contains ammonium ions in an amount of preferably at most 100 ppm. The amount of ammonium ions is more preferably at most 80 ppm, still more preferably at most 50 ppm. The lower limit thereof may be any value, and may be 0.01 ppm. If the amount of ammonium ions is kept within the above range, the fluorinated polyimide layer can have a low total haze value and yellowness index and a high total luminous transmittance.

The film of the present invention may be a monolayer film consisting only of the fluorinated polyimide layer, or may be a multilayer film including, in addition to the fluorinated polyimide layer, glass or a transparent resin base which is not formed from a fluorinated polyimide. Examples of the transparent resin base include polyethylene terephthalate (PET) resin, polyethylene naphthalate (PEN), cycloolefin (co)polymers (COP, COC), polycarbonate (PC) resin, polyimide (PI) resin, polymethyl methacrylate (PMMA), and polystyrene resin. For low moisture absorbency, PET resin, PEN resin, COP, COC, or PC resin is preferred. For low birefringency, COC or COP is more preferred.

If the film of the present invention is a multilayer film, the total haze value is preferably 8 or lower, more preferably 6 or lower. The lower limit thereof may be any value, and may be 0.2.

If the film of the present invention is a multilayer film, the yellowness index (YI) is preferably 6 or lower, more preferably 4 or lower. The lower limit thereof may be any value, and may be 0.7.

If the film of the present invention is a multilayer film, the total luminous transmittance is preferably 80% or higher, more preferably 85% or higher. The upper limit thereof may be any value, and may be 98%.

If the film of the present invention is a multilayer film, every material constituting the film preferably has a glass transition temperature of 60° C. or higher. The glass transition temperature thereof is more preferably 70° C. or higher, still more preferably 85° C. or higher, while preferably 350° C. or lower, more preferably 340° C. or lower.

The film also needs to have only a small number of optical defects. The optical defects of the film herein mean defects on the surface of the film and defects inside the film. Examples of the defects on the surface of the film include scratches, stains, and dusts on the surface. Examples of the defects inside the film include naps, voids, and cracks inside the film. The film of the present invention preferably has at most 10, more preferably at most 5, still more preferably at most 1, optical defects having a diameter of 0.15 mm or greater per square meter observed using a defect inspector.

The film of the present invention can be suitably produced by the following production method.

The film of the present invention can be suitably produced by a production method including:

Step (1) of providing a solution of polyamic acid by polyaddition of a fluorinated diamine and a fluorinated acid anhydride;

Step (2) of providing a fluorinated polyimide by cyclodehydration from the resulting polyamic acid solution;

Step (3) of dropwise adding the resulting solution to a poor solvent to precipitate the fluorinated polyimide and collecting the fluorinated polyimide in the form of powder;

Step (4) of dissolving the powdery fluorinated polyimide in a good solvent, dropwise adding the resulting solution to a poor solvent to precipitate the fluorinated polyimide, and collecting the fluorinated polyimide in the form of purified powder;

Step (5) of dissolving the fluorinated polyimide in a solvent to provide varnish; and Step (6) of applying the varnish to a base and drying the varnish to provide a film.

The polyaddition in Step (1) can be performed by a usual method. For example, the material monomers may be reacted under stirring in a solvent. The specifications of the fluorinated diamine and the fluorinated acid anhydride are as mentioned above. In addition to the fluorinated diamine and the fluorinated acid anhydride, any other diamine or anhydride mentioned above may be further polymerized.

The polyaddition may be performed under displacement of the gas in the system by inert gas, preferably nitrogen gas. The reaction temperature and the reaction time may be appropriately adjusted, and may respectively be 0° C. to 150° C., preferably room temperature (25° C.) to 100° C., and 2 to 24 hours, preferably 2 to 12 hours.

The polyaddition may be performed in a solvent. Examples of the solvent used for the polyaddition include amides such as N-methyl-2-pyrrolidone, dimethyl acetamide, and dimethyl formamide; sulfoxides such as dimethyl sulfoxide; aromatic solvents such as toluene and xylene; ethers such as diglyme and triglyme; and solvent mixtures thereof.

Step (1) provides a solution of polyamic acid dissolved in the solvent used for the polyaddition. The resulting polyamic acid contains a polymerized unit (A) based on a fluorinated diamine and a polymerized unit (B) based on a fluorinated acid anhydride.

The polyamic acid obtained in Step (1) preferably satisfies that the compositional ratio between the polymerized units (A) and (B) ((A):(B) (mole ratio)) is 55:45 to 45:55. The compositional ratio between the polymerized units (A) and (B) within such a range leads to a low relative permittivity of the fluorinated polyimide obtained by imidizing the polyamic acid. The compositional ratio between the polymerized units (A) and (B) ((A):(B) (mole ratio)) is more preferably 52:48 to 48:52, still more preferably 51:49 to 49:51.

The polyamic acid may further contain a different polymerized unit in addition to the polymerized units (A) and (B). Still, the polyamic acid preferably contains 60 mol % or more of the polymerized units (A) and (B) relative to all the polymerized units.

Since the sum of the proportions of the polymerized units (A) and (B) relative to all the polymerized units of the polyamic acid is 60 mol % or more, the fluorinated polyimide obtained by imidizing the polyamic acid is easily dissolved in a solvent. Thus, the fluorinated polyimide layer can be formed by application and the application needs not to be followed by high-temperature firing for imidization. As a result, a fluorinated polyimide layer having a low relative permittivity can be formed. The sum of the proportions of the polymerized units (A) and (B) is preferably 65 mol % or more, more preferably 70 mol % or more, still more preferably 80 mol % or more. The upper limit thereof can be 100 mol %.

The polyamic acid preferably contains 30 mol % or more of the polymerized unit (A) relative to all the polymerized units. Since the proportion of the polymerized unit (A) relative to all the polymerized units of the polyamic acid is within such a range, the fluorinated polyimide obtained by imidizing the polyamic acid is easily dissolved in a solvent. Thus, the fluorinated polyimide layer can be formed by application and the application needs not to be followed by high-temperature firing for imidization. As a result, a fluorinated polyimide layer having a low relative permittivity can be formed. The proportion of the polymerized unit (A) is more preferably 40 mol % or more, still more preferably 50 mol % or more, relative to all the polymerized units.

The polyamic acid preferably contains 30 mol % or more of the polymerized unit (B) relative to all the polymerized units. Since the proportion of the polymerized unit (B) relative to all the polymerized units of the polyamic acid is within such a range, the fluorinated polyimide obtained by imidizing the polyamic acid is easily dissolved in a solvent. Thus, the fluorinated polyimide layer can be formed by application and the application needs not to be followed by high-temperature firing for imidization. As a result, a fluorinated polyimide layer having a low relative permittivity can be formed. The proportion of the polymerized unit (B) is more preferably 40 mol % or more, still more preferably 50 mol % or more, relative to all the polymerized units.

Step (2) utilizes cyclodehydration to provide a solution of a fluorinated polyimide from the polyamic acid solution obtained in Step (1).

The cyclodehydration may be performed using the polyamic acid solution obtained in Step (1), or the polyamic acid may be isolated from the polyamic acid solution obtained in Step (1) and then the isolated polyamic acid may be used for the cyclodehydration. For excellent productivity, it is preferred to use the polyamic acid solution obtained in Step (1) for the cyclodehydration.

The cyclodehydration can be performed by a usual method. Examples thereof include a method of heating the polyamic acid obtained by the polyaddition and a method of chemically dehydrating the polyamic acid obtained by the polyaddition.

The method of heating the polyamic acid may be specifically performed at a reaction temperature of 20° C. to 300° C., preferably 50° C. to 200° C., for 1 to 48 hours, preferably 2 to 24 hours, in an inert gas atmosphere.

Examples of the inert gas include argon gas, helium gas, and nitrogen gas. In this process, a dehydrant such as phosphoric acid may be used.

The method of chemically dehydrating the polyamic acid may be specifically performed by treating the polyamic acid with a dehydrant and an imidizing agent. Such a treatment with an imidizing agent can be performed by a usual method.

The above treating method may be performed using, for example, an anhydride, such as acetic anhydride, propionic anhydride, or trifluoroacetic anhydride, as a dehydrant and a tertiary amine, such as pyridine, collidine, lutidine, or triethyl amine, as a dehydrating catalyst. Alternatively, the treatment may be performed by heating the polyamic acid together with a dehydrant such as phosphoric acid. The phosphoric acid may be used in combination with an anhydride or an imidizing agent.

The reaction temperature in the chemically dehydrating method may be about 10° C. to 200° C.

In order to provide a fluorinated polyimide layer having a low total haze value and yellowness index, the cyclodehydration is preferably performed by a chemically dehydrating method. Generation of a polyimide by heating a polyamic acid requires long-time heating at relatively high temperature. Such long-time, high-temperature heating unfortunately increases the total haze value and yellowness index of the resulting fluorinated polyimide layer. In other words, Step (2) is preferably a step of providing a fluorinated polyimide by a chemically dehydrating method without heating the polyamic acid up to a temperature exceeding 150° C.

The imidization ratio is preferably as high as possible, and the upper limit thereof is 100%. Too low an imidization ratio may cause poor transparency, and thus the lower limit thereof is preferably 70%.

The imidization ratio is determined by IR analysis.

In Step (3), the solution obtained in Step (2) is dropwise added to a poor solvent to precipitate the fluorinated polyimide, and the powdery fluorinated polyimide is collected. Examples of the poor solvent include water, methyl alcohol, ethyl alcohol, isopropyl alcohol, cyclohexanol, and toluene.

In Step (4), the powdery fluorinated polyimide obtained in Step (3) is dissolved in a good solvent, then the resulting solution is dropwise added to a poor solvent to precipitate the fluorinated polyimide, and the purified powdery fluorinated polyimide is collected.

Examples of the good solvent include amides such as N-methyl-2-pyrrolidone (NMP), dimethyl acetamide, and dimethyl formamide; sulfoxides such as dimethyl sulfoxide; esters such as γ-butyrolactone, butyl acetate, ethyl acetate, and ethyl lactate; and ketones such as methyl ethyl ketone, methyl isobutyl ketone, acetone, and cyclohexanone. Preferred are solvents in which the sum of ketones and/or esters occupies 40 mass % or more of the whole solvent, more preferred are solvents in which the sum of ketones and/or ester, occupies 50 mass % or more of the whole solvent, still more preferred are solvents in which the sum of ketones and/or esters occupies 75 mass % or more of the whole solvent.

Examples of the poor solvent include water, methyl alcohol, ethyl alcohol, isopropyl alcohol, cyclohexanol, and toluene.

Step (4) is one of the important steps in the above production method.

Since the production method includes Step (4) for purifying the fluorinated polyimide, the method enables adjustment of the amount of ammonium ions in the fluorinated polyimide layer obtained at last to a desired value, and enables production of a film containing a fluorinated polyimide layer having high heat resistance and a low total haze value and yellowness index.

Step (4) can be repeated any times. The step is preferably repeated until the amount of ammonium ions is reduced to a desired amount, more preferably three or more times, still more preferably five or more times. The resulting powdery fluorinated polyimide may be dried.

The powdery fluorinated polyimide contains ammonium ions in an amount of preferably at most 100 ppm relative to the fluorinated polyimide. The amount of ammonium ions is more preferably at most 80 ppm, still more preferably most 50 ppm. The lower limit thereof may be any value, and may be 0.01 ppm. If the amount of ammonium ions is kept within the above range, the fluorinated polyimide layer can have a low total haze value and yellowness index and a high total luminous transmittance.

The amount of ammonium ions can be determined by ion chromatography. Specifically, a polymer (or a polymer film) is put into water and sonicated for about two hours, and then the polymer (or the polymer film) is filtered off. The amount of ammonium ions dissolved in the filtrate can be determined by ion chromatography.

The powdery fluorinated polyimide contains coloring ions other than the ammonium ions in an amount of preferably at most 200 ppm, more preferably at most 50 ppm, still more preferably at most 10 ppm. If the amount of coloring ions is kept within the above range, the fluorinated polyimide layer can have a low total haze value and yellowness index and a high total luminous transmittance.

Examples of the coloring ions include transition metal cations such as $Fe^{2+}$, $Fe^{3+}$, and $Ni^{2+}$, and strong acid anions such as $Cl^-$ and $SO_4^{2-}$.

The amount of coloring ions is a value determined by the following method. That is, a certain amount of a powdery fluorinated polyimide is dissolved in a solvent such as NMP, and then the solution is dropwise added to water under stirring. The amount of coloring ions dissolved in water is determined by ion chromatography, and fie concentration thereof is converted into a desired value.

Specifically, for example, 10 g of a powdery fluorinated polyimide may be dissolved in 50 ml of NMP and the solution may be then dropwise added to 150 ml of water.

In Step (5), the fluorinated polyimide obtained in Step (4) is dissolved in a solvent to provide varnish.

Examples of the solvent for providing the varnish include amides such as N-methyl-2-pyrrolidone, dimethyl acetamide, and dimethyl formamide; sulfoxides such as dimethyl sulfoxide; esters such as γ-butyrolactone, butyl acetate, ethyl acetate, and ethyl lactate; and ketones such as methyl ethyl ketone, methyl isobutyl ketone, acetone, and cyclohexanone.

Preferred are solvents in which the sum of ketones and/or esters occupies 40 mass % or more of the whole solvent, more preferred are solvents in which the sum of ketones and/or esters occupies 50 mass % or more of the whole solvent, still more preferred are solvents in which the sum of ketones and/or esters occupies 75 mass % or more of the whole solvent.

Common polyimides are insoluble in solvents after ring closure. Solvent-soluble polyimides, which are made soluble in solvents after ring closure, contain an amide as a main solvent. A coating formed by applying varnish containing an amide unfortunately needs to be dried at high temperature.

Dissolution of the fluorinated polyimide in a solvent containing a large amount of ketones and/or esters enables drying of the coating at low temperature, and thus enables formation of a film containing a fluorinated polyimide layer having a low total haze value and yellowness index.

The varnish may have any concentration which allows the fluorinated polyimide to disperse, uniformly in a solvent. The solid content thereof is preferably 1 to 40 mol %, more preferably 5 to 30 mol %.

The varnish may contain other components in addition to the fluorinated polyimide and the solvent. Examples thereof include additives such as pigments, dyes, inorganic filler, organic filler, lubricants, and adhesion improvers, reactive low molecular weight molecules, and compatibilizers. The varnish may further contain other resin to the extent that does not impair the effects of the present invention.

The varnish contains ammonium ions in an amount of preferably at most 100 ppm relative to the fluorinated polyimide. The amount of ammonium ions is more preferably at most 80 ppm, still more preferably at most 50 ppm. The lower limit thereof may be any value, and may be 0.01 ppm. If the amount of ammonium ions is kept within the above range, the fluorinated polyimide layer can have a low total haze value and yellowness index and a high total luminous transmittance.

The amount of ammonium ions in the varnish is a value determined by the following method. That is, a certain amount of varnish is dropwise added to water under stirring. The amount of ammonium ions dissolved in water is determined by ion chromatography, and the concentration thereof is converted into a desired value.

Specifically, for example, the fluorinated polyimide concentration in the varnish may be adjusted to 20 mass %, and then 100 ml of the varnish may be added to 150 ml of water.

The varnish contains coloring ions other than the ammonium ions in an amount of preferably at most 200 ppm, more preferably at most 50 ppm, still more preferably at most 10 ppm. If the amount of coloring ions is kept within the above range, the fluorinated polyimide layer can have a low total haze value and yellowness index and a high total luminous transmittance.

Examples of the coloring ions include transition metal cations such as $Fe^{2+}$, $Fe^{3+}$, and $Ni^{2+}$, and strong acid anions such as $Cl^-$ and $SO_4^{2-}$.

The amount of coloring ions in the varnish is a value determined by the following method. That is, a certain amount of varnish is dropwise added to water under stirring. The amount of coloring ions dissolved in water is determined by ion chromatography, and the concentration thereof is converted into a desired value.

Specifically, for example, the fluorinated polyimide concentration in the varnish may be adjusted to 20 mass %, and then 100 ml of the varnish may be added to 150 ml of water.

In Step (6), the varnish containing the fluorinated polyimide is applied to a base, and then dried to provide a film containing a fluorinated polyimide layer.

In Step (6), unlike conventional methods, the varnish containing the fluorinated polyimide is applied to form a fluorinated polyimide layer, so that the step does not need imidization of the polyamic acid into a polyimide after the application. Thus, the drying temperature needs not to be as high as the temperature for imidization, and may be 250° C. or lower. The lower limit thereof may be 80° C. Since the drying temperature is within the above range, the production method can provide a film containing a fluorinated polyimide layer especially having a low total haze value and yellowness index.

In order to enable low-temperature drying, the solvent of the varnish is also preferably a solvent in which the sum of ketones and/or esters occupies 40 mass % or more of the whole solvent, more preferably a solvent in which the sum of ketones and/or esters occupies 50 mass % or more of the whole solvent, still more preferably a solvent in which the sum of ketones and/or esters occupies 75 mass % or more of the whole solvent. The solvent of the varnish may be specifically N-methyl-2-pyrrolidone (NMP), for example.

The drying temperature in Step (6) is preferably 200° C. or lower. The lower limit thereof is preferably higher than 60° C., more preferably 100° C. It is particularly advantageous to dry the varnish at 200° C. or lower so as to provide a film containing a fluorinated polyimide layer having a low total haze value and yellowness index.

The drying in Step (6) is preferably performed by passing the base with the varnish applied thereto through a furnace whose temperature is set to a temperature within the above range for 2 to 240 seconds per pass. The drying is preferably performed by passing the base through a furnace in which the temperature is set to increase slowly from a lower temperature to a higher temperature. More preferably, the drying is started at 40° C. to 80° C. and the temperature is increased up to 100° C. to 250° C. The time required for the temperature to reach the highest drying temperature is preferably 180 seconds or shorter, more preferably 150 seconds or shorter, while preferably 5 seconds or longer, more preferably 10 seconds or longer, still more preferably 30 seconds or longer. Such a multistage, slow temperature rise enables production of a film containing a fluorinated polyimide layer having a low total haze value and yellowness index. The total drying time is preferably 240 seconds or shorter, more preferably 150 seconds or shorter, still more preferably 120 seconds or shorter, while preferably 2 seconds or longer, more preferably 5 seconds or longer, still more preferably 30 seconds or longer.

The number of passes of the drying in Step (6) is preferably 3 passes or more, more preferably 4 passes or more, still more preferably 5 passes or more.

The production method preferably provides a film containing a fluorinated polyimide layer without heating at a temperature of higher than 200° C. for 30 minutes or longer.

The production method may include Step (7) of peeling the film from the base and collecting the fluorinated polyimide film.

The production method including Step (7) is suitable as a method for producing a monolayer film consisting only of a fluorinated polyimide film.

If the production method includes Step (7), the base used in Step (6) is not necessarily the above transparent resin base, and may be a base usually used for film casting.

After Step (7) of collecting the fluorinated polyimide film, the production method may include Step (8) of attaching, by lamination, the resulting fluorinated polyimide film with the transparent resin base which is not formed from a fluorinated polyimide film. If the production method includes this step, the method can provide a multilayer film.

In the lamination, an optical adhesive sheet is preferably used as an adhesive layer.

Alternatively, the film may be directly applied to the base and then dried.

In the production method, the base used in Step (6) may be the above transparent resin base which is not formed from a fluorinated polyimide film. In this case, a multilayer film can be produced without Steps (7) and (8).

Since the film of the present invention contains a fluorinated polyimide layer having high heat resistance and a low total haze value and yellowness index, it can be suitably used as a transparent conductive base or a base for flexible displays.

In order to use the resulting film as a transparent conductive base, a transparent conductive layer, such as an indium tin oxide (ITO) layer, needs to be vapor-deposited on the film. Thus, the film needs to have a mechanical strength durable to vapor-deposition. In this point, the film of the present invention has a mechanical strength durable to vapor-deposition.

If the film of the present invention is used as a transparent conductive base, the film is preferably a monolayer film consisting only of a fluorinated polyimide layer, and preferably has a thickness of 25 to 50 μm.

If the film of the present invention is used as a base for flexible displays, the film needs to have flexibility so as not to be broken even when being bent. In this point, the film of the present invention has sufficient flexibility.

If the film of the present invention is used as a base for flexible displays, the film is also preferably a monolayer film consisting only of a fluorinated polyimide layer, and preferably has a thickness of 0.1 to 500 μm. In other words, the fluorinated polyimide layer is preferably thick if it needs to have sufficient strength, while it is preferably thin in other cases. In order to achieve sufficient strength by means of other material, the film of the present invention is preferably used in the form of a laminate of a fluorinated polyimide layer and glass or a film of material such as a cycloolefin polymer, PET resin, PEN resin, or PC resin.

Since the film of the present invention contains a fluorinated polyimide layer having high heat resistance and a low total haze value and yellowness index, it can be suitably used as an optical film.

Examples of the optical film include polarizing films, retardation films, light diffuser films, optical filters, lens sheets, anti-reflection films, transparent electromagnetic shielding films, and glass alternative films. The optical film may also be used as a protective layer for Blu-ray discs.

EXAMPLES

The present invention will be described with reference to, but not limited to, examples.

The values in the examples were determined as follows.
(Total Luminous Transmittance)

The total luminous transmittance was determined by the luminous transmittance test in conformity with ASTM D1003 using a haze meter NDH7000SP CU2II (trade name) (Nippon Denshoku Industries Co., Ltd.).
(Total Haze Value and Internal Haze Value)

The total haze value was determined by the luminous transmittance test in conformity with ASTM D1003 using a haze meter NDH7000SP CU2II (trade name) (Nippon Denshoku industries Co., Ltd.).

The internal haze value was determined using a haze meter NDH7000SP CU2II (trade name) (Nippon Denshoku Industries Co., Ltd.). Specifically, a glass cell was charged with water and a reference value was determined. Then, a film was put into the water and the haze value was determined. Finally, the internal haze value was determined by calculating the difference between the resulting haze value and the reference value.
(Thickness)

The thickness was measured using F-20 (Filmetrics Japan, Inc.).
(Amount of Ammonium Ions)

The amount of ammonium ions was determined by ion chromatography. Specifically, a polymer (or a polymer film) was put into water and sonicated for about two hours, and then the polymer (or the polymer film) was filtered off. The amount of ammonium ions dissolved in the filtrate was determined by ion chromatography. The ion chromatograph used was DX500 (Dionex Corp.).
(Yellowness Index (YI))

The yellowness index (YI) was expressed by the dYI value which corresponds to the difference in YI value between a sample and a white standard plate as a color standard using SM series color computer SM-7 (Suga Test instruments Co., Ltd.).

Synthesis Example 1

A 500-ml three-neck flask equipped with a reflux condenser and a thermometer was charged with 300 ml of N-methyl-2-pyrrolidone (NMP) under nitrogen stream, followed by 50 g of 2,2'-bis(3,4-dicarboxyphenyl)hexafluoropropane dianhydride (6FDA) and 37.4 g of 2,2'-bis(trifluoromethyl)-4,4'-diaminobiphenyl (PFMB). The system was warmed up to 120° C. and 40 g of pyridine was added. Then, 50 g of trifluoroacetic anhydride was added and the mixture was stirred at 150° C. for eight hours. Finally, 3 g of benzoic anhydride is added and the mixture was stirred for one hour so as to achieve capping. Thereby, a solution containing Polymer 1 was obtained.

The resulting solution containing Polymer 1 was purified to provide Polymer 1 by the following Purification Method 1. Polymer 1 was found by IR analysis to be a copolymer satisfying the ratio (polymerized unit based on 6FDA)/(polymerized unit based on PFMB)=50/50 (mole ratio). The purified Polymer 1 contained ammonium ions in an amount shown in Table 1. IR analysis also showed that all the polyamic acid molecules were cyclized and the imidization ratio was 100%.

Synthesis Example 2

6FDA, PFMB, and 4,4'-diaminobiphenyl were prepared in a mole ratio of 50/40/10, and the polymerization and the cyclodehydration were performed in the same manner as in Synthesis Example 1. Thereby, a solution containing Polymer 2 was obtained.

Synthesis Example 3

6FDA, 2,2'-bis(3,4-dicarboxyphenyl)propane dianhydride, PFMB, and 4,4'-diaminobiphenyl were prepared in a mole ratio of 40/10/40/10, and the polymerization and the cyclodehydration were performed in the same manner as in Synthesis Example 1. Thereby, a solution containing Polymer 3 was obtained.

Synthesis Example 4

6FDA, 2,2'-bis(3,4-dicarboxycyclohexyl)hexafluoropropane dianhydride, PFMB, and 4,4'-diaminobiphenyl were prepared in a mole ratio of 40/10/40/10, and the polymerization and the cyclodehydration were performed in the same manner as in Synthesis Example 1. Thereby, a solution containing Polymer 4 was obtained.
Purification Method 1

The solution obtained in each of the synthesis examples was subjected to reprecipitation in which the solution was dropwise added to 2 L of water under stirring. The dropwise addition was followed by precipitation of the polymer. The polymer powder was collected by filtering.

The collected powder was dissolved in 100 g of NMP, and the reprecipitation was repeated five times.
Purification Method 2

The solution obtained in each of the synthesis examples was subjected to reprecipitation in which the solution was dropwise added to 2 L of water under stirring. The dropwise addition was followed by precipitation of the polymer. The polymer powder was collected by filtering.

Example 1

The solution obtained in Synthesis Example 1 was purified by Purification Method 1, and the resulting polymer was dissolved in a solution of NMP/MEK=2/8 so as to give a solid content or 15 mass %. Thereby, a coating was obtained. The resulting coating was filtered through a pleated depth type filter having a pore size of 3 μm. The filtered coating was cast on a steel belt using a die coater and dried. Thereby, a polymer film having a thickness of 25 μm was produced.

The drying was performed as follows. A drying device was divided into four zones, each having a length of 2 m. The drying temperatures were respectively set to 80° C., 120° C., 150° C., and 180° C. from the inlet side. The passing rate of each zone was set to a circumferential velocity of 8 m/min. The film (or the cast coating) was then passed through this device. The amount of ammonium ions, total luminous transmittance, total haze value, internal haze value, and dYI of the resulting polymer film were determined. Table 1 shows the results.

Examples 2 to 4 and Comparative Examples 1 to 3

A polymer film was produced in the same manner as in Example 1 except that the type of the polymer and the purification method were changed as shown in Table 1. The amount of ammonium ions, total luminous transmittance, total haze value, internal haze value, and dYI of the resulting polymer film were determined. Table 1 shows the results.

Example 6

A polymer film was produced in the same manner as in Example 5 except that the temperatures of the drying device were changed to 110° C. constant. The amount of ammonium ions, total luminous transmittance, total haze value, internal haze value, and dYI of the resulting polymer film were determined. Table 2 shows the results.

Comparative Examples 4 to 6

A polymer film was produced in the same manner as in Example 5 except that the temperatures of the drying device

TABLE 1

| | Type of polymer | Purification method | Amount of ammonium ions in purified polymer (ppm) | Amount of ammonium ions in polymer film (ppm) | Total luminous transmittance (%) | Total haze value | Internal haze value | dYI |
|---|---|---|---|---|---|---|---|---|
| Example 1 | 1 | 1 | 25 | 25 | 95 | 0.3 | 0.1 | 1.1 |
| Example 2 | 2 | 1 | 32 | 32 | 95 | 0.4 | 0.2 | 1.2 |
| Example 3 | 3 | 1 | 41 | 41 | 92 | 0.4 | 0.2 | 1.3 |
| Example 4 | 4 | 1 | 34 | 34 | 96 | 0.3 | 0.1 | 1.4 |
| Comparative Example 1 | 1 | 2 | 242 | 242 | 89 | 1.8 | 1.2 | 5.5 |
| Comparative Example 2 | 2 | 2 | 454 | 454 | 88 | 2.2 | 1.5 | 6.3 |
| Comparative Example 3 | 3 | 2 | 462 | 462 | 92 | 2.4 | 1.5 | 8.3 |

The table shows the larger the amount of ammonium ions, the lower the transparency (total luminous transmittance), the higher the total haze value and the internal haze value, and the higher the dYI.

Example 5

The solution obtained in Synthesis Example 1 was purified by Purification Method 1, and the resulting polymer was dissolved in a solution of NMP/MEK=2/8 so as to give a solid content of 15 mass %. Thereby, a coating was obtained.

were changed to 120° C. constant in Comparative Example 4; 150° C. constant in Comparative Example 5; and 90° C. constant in Comparative Example 6. The amount of ammonium ions, total luminous transmittance, total haze value, internal haze value, and dYI of the resulting polymer film were determined. Table 2 shows the results.

In Comparative Example 6, NMP remained in the polymer film and the product was not treated as a film. Thus, no measurement was performed.

TABLE 2

| | Amount of ammonium ions in purified polymer (ppm) | Drying temperature | Amount of ammonium ions in polymer film (ppm) | Total luminous transmittance (%) | Total haze value | Internal haze value | dYI |
|---|---|---|---|---|---|---|---|
| Example 5 | 25 | 60° C.-90° C.-120° C.-150° C. | 25 | 95 | 0.3 | 0.1 | 1.1 |
| Example 6 | 25 | 110° C. constant | 25 | 95 | 3.6 | 2.1 | 1.1 |
| Comparative Example 4 | 25 | 120° C. constant | 25 | 95 | 4.2 | 2.5 | 1.1 |
| Comparative Example 5 | 25 | 150° C. constant | 25 | 95 | 4.7 | 2.8 | 1.3 |
| Comparative Example 6 | 25 | 90° C. constant | — | — | — | — | — |

The resulting coating was filtered through a pleated depth type filter having a pore size of 3 μm. The filtered coating was cast on a steel belt using a die coater and dried. Thereby, a polymer film having a thickness of 25 μm was produced.

The drying was performed as follows. A drying device was divided into four zones, each having a length of 2 m. The drying temperatures were respectively set to 60° C., 90° C., 120° C., and 150° C. from the inlet side. The passing rate of each zone was set to a circumferential velocity of 8 m/min. The film (or the cast coating) was then passed through this device. The amount of ammonium ions, total luminous transmittance, total haze value, internal haze value, and dYI of the resulting polymer film were determined. Table 2 shows the results.

The table shows that inappropriate drying temperatures caused excessively high total haze value and internal haze value and that the resulting films were inappropriate as optical films requiring transparency.

Example 7

A polymer film was produced in the same manner as in Example 1 except that the thickness of the polymer film was changed to 50 μm.

The amount of ammonium ions, total luminous transmittance, total haze value, internal haze value, and dYI of the resulting polymer film were determined. Table 3 shows the results.

Example 8

A polymer film was produced in the same manner as in Example 1 except that the purification method was changed to Purification Method 3 to be mentioned later. The amount of ammonium ions, total luminous transmittance, total haze value, internal haze value, and dYI of the resulting polymer film were determined. Table 3 shows the results.

Comparative Example 7

A polymer film was produced in the same manner as in Example 1 except that the purification method was changed to Purification Method 3 to be mentioned later and the thickness of the polymer film was changed to 50 μm. The amount of ammonium ions, total luminous transmittance, total haze value, internal haze value, and dYI of the resulting polymer film were determined. Table 3 shows the results.

Purification Method 3

The solution obtained in each of the synthesis examples was subjected to reprecipitation in which the solution was dropwise added to 2 L of water under stirring. The dropwise addition was followed by precipitation of the polymer. The polymer powder was collected by filtering.

The collected powder was dissolved in 100 g of NMP, and the reprecipitation was repeated twice.

TABLE 3

|  | Purification method | Amount of ammonium ions in purified polymer (ppm) | Amount of ammonium ions in polymer film (ppm) | Thickness (μm) | Total luminous transmittance (%) | Total haze value | Internal haze value | dYI |
|---|---|---|---|---|---|---|---|---|
| Example 7 | 1 | 25 | 25 | 50 | 94 | 0.5 | 0.2 | 1.3 |
| Example 8 | 3 | 121 | 121 | 25 | 93 | 1.2 | 0.6 | 2.2 |
| Comparative Example 7 | 3 | 121 | 121 | 50 | 91 | 3.1 | 2.1 | 3.6 |

The table shows that, with respect to the films containing more than 100 ppm of ammonium ions, a change in thickness caused a great reduction in transparency.

(Inspection for Defects of Film)

The polymer films obtained in Examples 1, 2, and 5 and Comparative Examples 1, 4, and 5 were subjected to defect inspection. Defects were inspected by an image circuit using a defect inspector (MaxEye.Impact, Futec Inc.). The defects having a diameter of 0.15 mm or greater (detected by both image circuit and difference circuit) were counted. Table 4 shows the results.

TABLE 4

|  | Number of defects (per m²) |
|---|---|
| Example 1 | 0.9 |
| Example 2 | 0.8 |
| Comparative Example 1 | 38 |
| Example 5 | 1.1 |
| Comparative Example 4 | 88 |
| Comparative Example 5 | 287 |

The above results show that a large amount of impurities or inappropriate drying conditions caused many defects.

Examples 9 to 12

The polymer film obtained in Example 1 was attached to glass, a PC film, a PET film, or a COC film with an adhesive layer in between to provide a laminate. The internal haze value of the resulting laminate was determined. Table 5 shows the results.

The attachment was specifically performed as follows.

First, an adhesive layer was attached using a roller to a base, i.e., glass, a PC film, a PET film, or a COC film while a protective film on one surface of the adhesive layer was peeled off. Then, the protective film on the surface of the adhesive layer opposite to the surface attached to the base was peeled off, and the polymer film obtained in Example 1 was attached to this surface using a roller. Thereby, a laminate was obtained.

TABLE 5

|  |  | Thickness (μm) | Internal haze value |
|---|---|---|---|
| Thickckness and internal haze value of each layer in laminate | Glass | 540 | 0.0 |
|  | PC film | 80 | 0.6 |
|  | PET film | 50 | 0.8 |
|  | COC film | 100 | 0.6 |
|  | Adhesive layer | 10 | 0.4 |
| Example 9 | Glass/adhesive layer/polymer film | 575 | 0.5 |

TABLE 5-continued

|  |  | Thickness (μm) | Internal haze value |
|---|---|---|---|
| Example 10 | PC film/adhesive layer/polymer film | 115 | 1.1 |
| Example 11 | PET-fllm/adhesive layer/polymer film | 85 | 1.3 |
| Example 12 | COC film/adhesive layer/polymer film | 135 | 1.1 |

The table shows that the thickness and internal haze value of the laminate produced by attaching the layers with an adhesive layer in between were respectively the sum of the thicknesses and the sum of the internal haze values of the layers attached.

Example 13

The solution obtained in Synthesis Example 1 was purified by Purification Method 1, and the resulting polymer was dissolved in a solution of NMP/MEK=2/8 so as to give a solid content of 15 mass %. Thereby, a coating was obtained. The resulting coating was filtered through a pleated depth type filter having a pore size of 3 μm. The filtered coating was cast on glass having a thickness of 540 μm using a die coater and dried. Thereby, a laminate including a polymer film having a thickness of 25 μm was produced.

The drying was performed as follows. A drying device was divided into four zones, each having a length of 2 m.

The drying temperatures were respectively set to 60° C., 90° C., 120° C., and 150° C. from the inlet side. The passing rate of each zone was set to a circumferential velocity of 8 m/min. The film (or the cast coating) was then passed through this device. The internal haze value of the resulting laminate was determined. Table 6 shows the results.

Examples 14 to 16

A laminate was produced in the same manner as in Example 13 except that the glass having a thickness of 540 µm was changed to a PC film having a thickness of 80 µm, a PET film having a thickness of 50 µm, or a COC film having a thickness of 100 µm. The internal haze value of the resulting laminate was determined. Table 6 shows the results.

TABLE 6

|  |  | Thickness (µm) | Internal hase value |
|---|---|---|---|
| Thickness and internal haze value of each layer in laminate | Glass | 540 | 0.0 |
|  | PC film | 80 | 0.6 |
|  | PET film | 50 | 0.8 |
|  | COC film | 100 | 0.6 |
| Example 13 | Glass/polymer film | 565 | 0.1 |
| Example 14 | PC film/polymer film | 105 | 0.7 |
| Example 15 | PET film/polymer film | 75 | 0.9 |
| Example 16 | COC film/polymer film | 125 | 0.7 |

The table shows that the laminate produced by application required no adhesive layer, so that the laminate was allowed to have a reduced thickness and thus had a lower internal haze value.

The invention claimed is:

1. A film comprising
a fluorinated polyimide layer having a total haze value of 4 or lower, a yellowness index of 3 or lower, and a total luminous transmittance of 90% or higher, and which has at most 10 optical defects having a diameter of 0.15 mm or greater per square meter.

2. The film according to claim 1,
wherein the fluorinated polyimide layer is formed from a fluorinated polyimide containing a polymerized unit (A) based on a fluorinated diamine and a polymerized unit (B) based on a fluorinated acid anhydride,
the fluorinated diamine comprising:
a fluorinated diamine represented by the following formula (1):

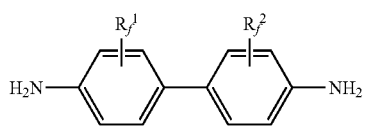

wherein $R_f^1$ and $R_f^2$ are substituents of the aromatic rings, and one of four substituent portions in each aromatic ring is replaced by the substituent; $R_f^1$ and $R_f^2$ may be the same as or different from each other, and are each a fluorine atom or a C1-C8 fluorine-containing alkyl group; and/or a fluorinated diamine represented by the following formula (2):

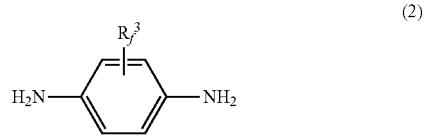

wherein $R_f^3$ is a substituent of the aromatic ring, and one of four substituent portions in the aromatic ring is replaced by the substituent; $R_f^3$ is a fluorine atom or a C1-C8 fluorine-containing alkyl group,
the fluorinated acid anhydride comprising:
a fluorinated acid anhydride represented by the following formula (3):

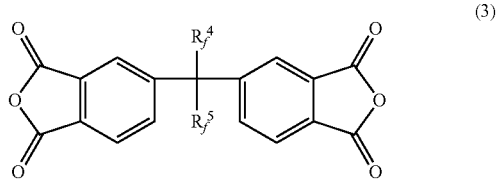

wherein $R_f^4$ and $R_f^5$ may be the same as or different from each other, and are each a fluorine atom or a C1-C8 fluorine-containing alkyl group.

3. The film according to claim 1,
wherein the fluorinated polyimide layer contains ammonium ions in an amount of at most 100 ppm relative to the fluorinated polyimide layer.

4. The film according to claim 2,
wherein the fluorinated polyimide contains 60 mol % or more of the polymerized units (A) and (B) relative to all the polymerized units.

5. The film according to claim 2,
wherein the fluorinated polyimide contains 30 mol % or more of the polymerized unit (B) relative to all the polymerized units.

6. The film according to claim 2,
wherein the fluorinated polyimide further contains a polymerized unit (C) based on a non-fluorinated diamine.

7. The film according to claim 2,
wherein the fluorinated polyimide further contains a polymerized unit (D) based on a different acid anhydride.

8. The film according to claim 1, further comprising glass or a transparent resin base which is not formed from a fluorinated polyimide.

9. The film according to claim 1, which is to be used for a transparent conductive base or a base for flexible displays.

10. The film according to claim 1, which is an optical film.

* * * * *